United States Patent
Buskens et al.

(10) Patent No.: US 7,366,949 B2
(45) Date of Patent: Apr. 29, 2008

(54) DISTRIBUTED SOFTWARE APPLICATION SOFTWARE COMPONENT RECOVERY IN AN ORDERED SEQUENCE

(75) Inventors: Richard W. Buskens, Robbinsville, NJ (US); Weilin Gong, Bartlett, IL (US); Oscar J. Gonzalez, Bridgewater, NJ (US); Li Kuang, Lisle, IL (US); Tim T. Liim, Holmdel, NJ (US); Yow-Jian Lin, Edison, NJ (US); Sunil K. Mishra, Aurora, IL (US); Pravish Prabhakar, Lisle, IL (US); Muhammad A. Siddiqui, Monmouth Junction, NJ (US); Timothy A. Suchaczewski, Somonauk, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 479 days.

(21) Appl. No.: 10/867,590

(22) Filed: Jun. 14, 2004

(65) Prior Publication Data

US 2006/0080411 A1    Apr. 13, 2006

(51) Int. Cl.
*G06F 11/00* (2006.01)
(52) U.S. Cl. .......................... 714/15; 714/20
(58) Field of Classification Search .......... 714/15, 714/20
See application file for complete search history.

(56) References Cited

U.S. PATENT DOCUMENTS

| 6,115,830 | A * | 9/2000 | Zabarsky et al. | 714/15 |
| 6,430,590 | B1 * | 8/2002 | Fischer | 718/100 |
| 6,766,471 | B2 * | 7/2004 | Meth | 714/16 |
| 6,883,170 | B1 * | 4/2005 | Garcia | 718/1 |

* cited by examiner

*Primary Examiner*—Michael Maskulinski (57) ABSTRACT

A distributed software application comprises a plurality of software components within a plurality of executables. A manager component for the distributed software application performs a recovery of two or more software components, of the plurality of software components, in an ordered sequence based on one or more dependency relationships among the plurality of software components.

21 Claims, 2 Drawing Sheets

DISTRIBUTED SOFTWARE APPLICATION SOFTWARE COMPONENT RECOVERY IN AN ORDERED SEQUENCE

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties.

"INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT," by Buskens, et al., co-filed herewith;

"SELECTING A PROCESSOR TO RUN AN EXECUTABLE OF A DISTRIBUTED SOFTWARE APPLICATION UPON STARTUP OF THE DISTRIBUTED SOFTWARE APPLICATION," by Buskens, et al., co-filed herewith;

"SOFTWARE COMPONENT INITIALIZATION IN AN ORDERED SEQUENCE," by Buskens, et al., co-filed herewith;

"SHUTTING DOWN A PLURALITY OF SOFTWARE COMPONENTS IN AN ORDERED SEQUENCE," by Buskens, et al., co-filed herewith;

"MANAGER COMPONENT FOR CHECKPOINT PROCEDURES," by Buskens, et al., co-filed herewith;

"MANAGER COMPONENT THAT CAUSES FIRST SOFTWARE COMPONENT TO OBTAIN INFORMATION FROM SECOND SOFTWARE COMPONENT," by Buskens, et al., co-filed herewith;

"FIRST AND SECOND MANAGER COMPONENTS THAT COMMUNICATE TO INITIALIZE AND/OR SHUT DOWN SOFTWARE COMPONENTS IN AN ORDERED SEQUENCE," by Buskens, et al., co-filed herewith;

"MANAGER COMPONENT RESOURCE ADDITION AND/OR RESOURCE REMOVAL ON BEHALF OF DISTRIBUTED SOFTWARE APPLICATION," by Gong, et al., co-filed herewith;

"SUBSTITUTE MANAGER COMPONENT THAT OBTAINS STATE INFORMATION OF ONE OR MORE SOFTWARE COMPONENTS UPON FAILURE OF A FIRST MANAGER COMPONENT," by Buskens, et al., co-filed herewith.

TECHNICAL FIELD

The invention relates generally to distributed software applications and more particularly to management of distributed software applications.

BACKGROUND

In known distributed software applications, software components are distributed among a plurality of executables (i.e., software capsules or software entities). Each of the executables contains one or more software components that perform some portion of the functionality of the distributed software application. For distributed software applications to work, the software components need to interact with each other. Many software components comprise dependency relationships with other software components of the distributed software application. When a failure of a software component occurs, other software components may be affected. For example, if a first software component is dependent on a second software component, a failure of the second software component will affect the first software component. Recovery of the second software component must also take the dependency of the first software component into account. For example, the first software component may need to be restarted once the second software component has been recovered. In known distributed software applications, the first and second software components handle the recovery of the first and second software components.

As one shortcoming, a software developer must create extra software within the first and second software components to perform the recovery. As another shortcoming, the first and second software components may not know of other potential problems within the distributed software application, for example, a faulty processor or communication link.

Thus, a need exists to alleviate software components of the responsibility of recovery of software components with consideration for dependency relationships between the software components.

SUMMARY

In one embodiment, there is provided an apparatus comprising a manager component for a distributed software application. The distributed software application comprises a plurality of software components within a plurality of executables. The manager component performs a recovery of two or more software components, of the plurality of software components, in an ordered sequence based on one or more dependency relationships among the plurality of software components.

In another embodiment, there is provided a method for recovering two or more software components of a plurality of software components for a distributed software application in an ordered sequence based on one or more dependency relationships among the plurality of software components.

In yet another embodiment, there is provided an apparatus comprising a high availability manager component, of a high availability infrastructure for a distributed software application that comprises a plurality of software components, and one or more executable managers of the high availability infrastructure. The plurality of software components comprise management support software, wherein the management support software comprises a portion of the high availability infrastructure. The high availability manager component, the one or more executable managers, and the management support software cooperate to recover two or more of the plurality of software components in an ordered sequence based on one or more dependency relationships among the plurality of software components.

DESCRIPTION OF THE DRAWINGS

Features of exemplary implementations of the invention will become apparent from the description, the claims, and the accompanying drawings in which:

DETAILED DESCRIPTION

Figure 1:
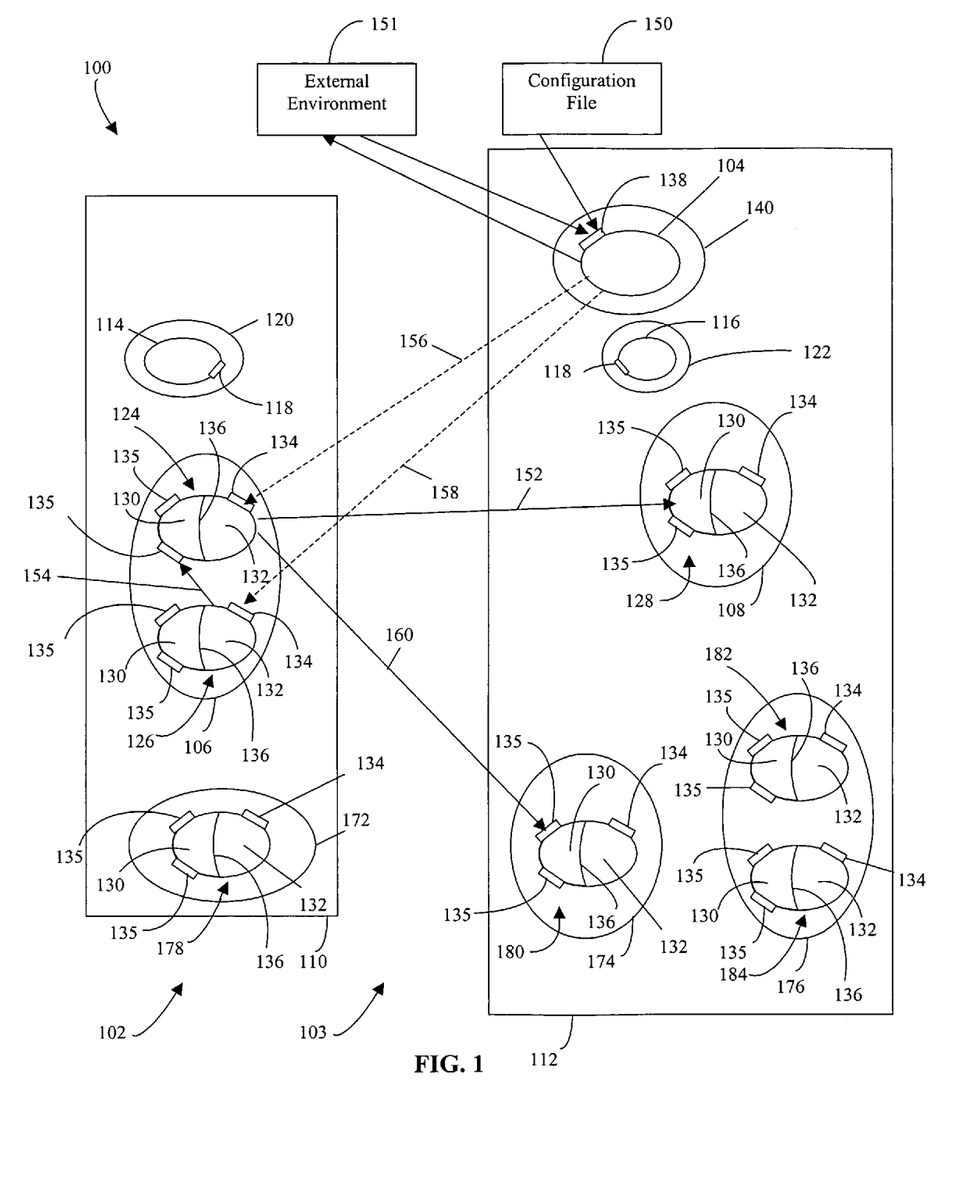
FIG. 1 is a representation of an exemplary implementation of an apparatus that comprises a distributed software application and one or more manager components.

Turning to FIG. 1, an apparatus 100 in one example comprises a distributed software application 102 and one or more management infrastructures 103. The distributed software application 102 represents a software application divided among a plurality of executables (i.e., software capsules or software entities). For example, the distributed software application 102 comprises a plurality of executables 106, 108, 172, 174 and 176. The distributed software application 102 may run on a single central processing unit ("CPU") or may be divided between multiple CPUs. For example, the executable 106 may run on a processor 110 and the executable 108 may run on a processor 112.

The executables 106, 108, 172, 174 and 176 comprise one or more software components 124, 126, 128, 178, 180, 182 and 184 of the distributed software application 102, as described herein. For example, the executable 106 encapsulates the software components 124 and 126 and the executable 108 encapsulates the software component 128. Within each of the executables 106, 108, 172, 174 and 176 may be tens, hundreds, or even thousands of other software components (e.g., analogous to the software components 124, 126, 128, 178, 180, 182 and 184).

The distributed software application 102 comprises a plurality of software components, for example, the software components 124, 126, 128, 178, 180, 182 and 184. The software components 124, 126, 128, 178, 180, 182 and 184 represent software sub-entities of the executables 106, 108, 172, 174 and 176. For example, the software components 124, 126, 128, 178, 180, 182 and 184 represent logical software blocks and/or software objects. The software components 124 and 126 in one example are developed independently and then put together within the executable 106. For example, the software components 124 and 126 are compiled into the executable 106. The distributed software application 102 may provide any functionality for a computer system. The distributed software application 102 in one example comprises a call processing software application. For example, the distributed software application 102 sets up and/or tears down telecommunication sessions in a telecommunication network.

The management infrastructure 103 performs one or more management procedures for the distributed software application 102. For example, the management infrastructure 103 provides a reusable software framework for one or more management procedures. For example, the management infrastructure 103 handles one or more of starting, stopping, initializing, and monitoring the distributed software application 102, detecting failures of the distributed software application 102, recovering the distributed software application 102, propagating state changes about the distributed software application 102, establishing communication channels between the software components 124, 126, 128, 178, 180, 182 and 184, and the like.

The management infrastructure 103 in one example comprises one or more manager components 104, one or more executable managers 114 and 116 and/or one or more management support components 132. The management infrastructure 103 may run on one or more of the processors 110, 112, and/or a remote processor (not shown). The manager component 104 in one example handles startup, shutdown, initialization, failure detection, recovery, and other functions for the distributed software application 102, as will be appreciated by those skilled in the art.

One or more of the components of the management infrastructure 103, for example, the manager component 104, the executable managers 114 and 116, and the management support software 132 of the software components 124, 126, 128, 178, 180, 182 and/or 184, in one example detect one or more failures and/or faults of the distributed software application 102 and/or the management infrastructure 103. In one example, the software component 124 of the distributed software application 102 returns a response to the manager component 104 during initialization that indicates an error. In another example, the manager component 104 employs a timer to determine a timeout for a message response. For example, the manager component 104 determines an error has occurred if it has not received a message response from the software component 124 within a predetermined time interval, for example, thirty seconds. The components of the management infrastructure 103 in one example communicate through employment of a fault-tolerant and/or redundant messaging protocol. For example, the fault-tolerant messaging protocol comprises handshake procedures, delivery confirmations, message timeouts, fault detection procedures, and fault escalation procedures, as will be appreciated by those skilled in the art.

The manager component 104 comprises a communication interface 138 for receiving incoming communications. The communication interface 138 is employable for receiving a configuration file 150 for the distributed software application 102. The manager component 104 may employ other means to receive the configuration file 150, such as reading the configuration file 150 directly from a disk or file system. The manager component 104 may also use the communication interface 138 for receipt of external system information from an external environment 151. The external environment 151 in one example represents other components of the system that are in communication with the manager component 104. The communication interface 138 may also receive communications from the executable managers 114 and 116, as well as communications from the software components 124, 126, 128, 178, 180, 182 and 184. The manager component 104 is encapsulated with zero or more other software components in an executable 140. The executable 140 that contains the manager component 104 may be run on either of the processors 110 and 112.

The manager component 104 in one example establishes one or more communication channels between the software components 124, 126, 128, 178, 180, 182 and 184. In one example, the manager component 104 establishes a communication channel 152 between the software component 124 and the software component 128. In another example, the manager component 104 establishes a communication channel 154 between the software component 126 and the software component 124. The manager component 104 sends one or more messages, for example, the messages 156 and 158, to the management support software 130 of the software components 124 and 126, respectively, to establish the communication channels 152 and 154.

The executable managers 114 and 116 comprise a communication interface 118 for communication with the manager component 104. The executable managers 114 and 116 in one example receive instruction from the manager component 104. For example, the executable managers 114 and 116 may receive instructions at the communication interface 118 from the manager component 104. The executable managers 114 and 116 in one example are encapsulated in an executable 120 and an executable 122, respectively.

The executable managers 114 and 116 monitor executables and/or software components of the distributed software application 102 that run on the processors 110 and 112, such as the executables 106, 108, 172, 174 and 176 and the software components 124, 126, 128, 178, 180, 182 and/or 184. For example, the executable managers 114 and 116 monitor communication channels and/or diagnostics on behalf of the executables 106, 108, 172, 174 and 176, and the software components 124, 126, 128, 178, 180, 182 and 184. Should one or more of the executables 106, 108, 172, 174 and 176 and/or the software components 124, 126, 128, 178, 180, 182 and 184 fail, the respective executable manager informs the manager component 104 of the failure.

In one example, the management infrastructure 103 comprises one executable manager per processor. For example, the executable 120 of the executable manager 114 runs on the processor 110. The executable manager 114 monitors the executables 106 and 172 and the software components 124, 126 and 178. The executable 122 of the executable manager 116 runs on the processor 112. The executable manager 116 monitors the executables 108, 174 and 176 and the software components 128, 180, 182 and 184.

Each of the software components 124, 126, 128, 178, 180, 182 and 184 comprise application software 130, management support software 132, a management support software communication interface 134, and one or more application software communication interfaces 135. The software components 124, 126, 128, 178, 180, 182 and 184 employ the management support software communication interface 134 to receive communications from the manager component 104. The software components 124, 126, 128, 178, 180, 182 and 184 employ the application software communication interfaces 135 to receive communications from other software components of the software components 124, 126, 128, 178, 180, 182 and 184. An application programming interface ("API") 136 communicatively couples the application software 130 with the management support software 132 in each of the software components 124, 126, 128, 178, 180, 182 and 184. The application software 130 and the management support software 132 can exchange information through the application programming interface 136. The manager component 104 in one example generates the application programming interface 136 through employment of a code generator.

The software components 124, 126, 128, 178, 180, 182 and 184 each perform some portion of the overall functionality of the distributed software application 102. The software components 124, 126, 128, 178, 180, 182 and 184 work together to make the distributed software application 102 achieve the desired operation. For example, the software components 124, 126, 128, 178, 180, 182 and 184 process incoming requests from each other and perform operations to provide the overall functionality.

An application developer creates the application software 130 of the software components 124, 126, 128, 178, 180, 182 and 184 to perform the designated functionality of the software components 124, 126, 128, 178, 180, 182 and 184. For example, the application developer creates the application software 130 of the software components 124, 126, 128, 178, 180, 182 and 184 to achieve the overall functionality of the distributed software application 102. The management support software 132 of the software components 124, 126, 128, 178, 180, 182 and 184 communicatively couples the software components 124, 126, 128, 178, 180, 182 and 184 to allow the application software 130 to perform the functionality of the distributed software application 102.

To alleviate the application developers from being required to write software into each of the software components 124, 126, 128, 178, 180, 182 and 184 for the management procedures, the manager component 104, the executable managers 114 and 116, and the management support software 132 cooperate to perform the management procedures for the software components 124, 126, 128, 178, 180, 182 and 184. A code generator of the management infrastructure 103 in one example automatically generates the management support software 132. The code generator of the management infrastructure 103 employs the configuration file 150 to create the management support software 132. For example, the configuration file 150 comprises connection information and/or architecture information of the distributed software application 102. The code generator creates code for the management support software 132. The code for the management support software 132 is compiled and linked with the application software 130 in the software components 124, 126, 128, 178, 180, 182 and 184. The management support software 132 may be different for each of the software components 124, 126, 128, 178, 180, 182 and 184, as will be appreciated by those skilled in the art.

One or more of the manager component 104, the executable managers 114 and 116, and/or the software components 124, 126, 128, 178, 182, 184 and 180 in one example comprise a portion of an active/standby group. Each active/standby group comprises a first component (i.e. active component) and a second component (i.e. standby component). The first component performs a portion of the overall functionality of the distributed software application 102 or the management infrastructure 103 while the second components remain inactive. Upon a failure of the first component, the second component is promoted to an active status. For example, the standby component becomes an active component and begins to perform the portion of the overall functionality. The standby component provides a redundancy in operation of the distributed software application 102 and/or the management infrastructure 103. The active/standby group promotes a reduction in downtime for the distributed software application 102 and/or the management infrastructure 103, as will be appreciated by those skilled in the art.

Figure 2:
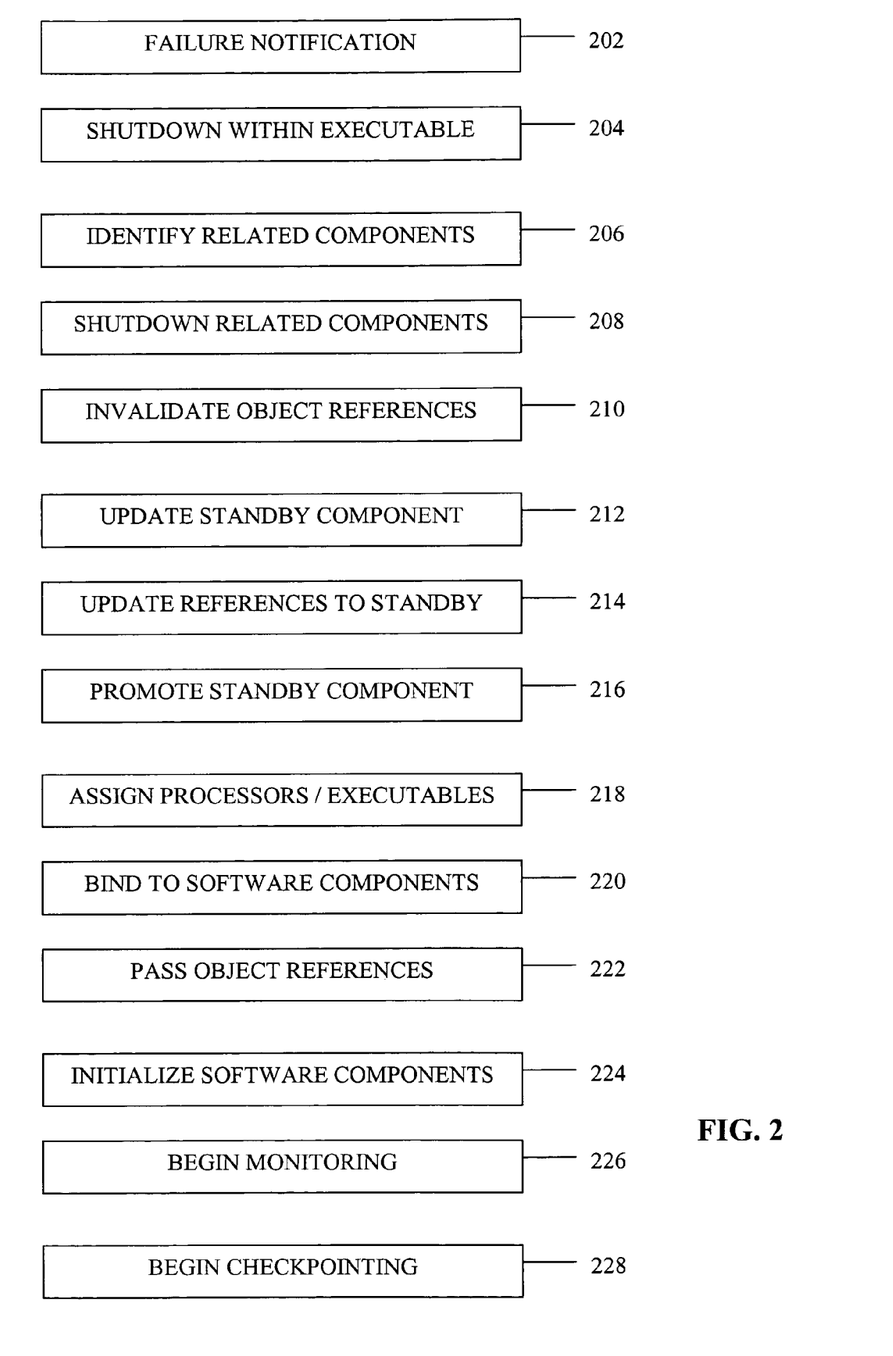
FIG. 2 is a representation of exemplary logic that serves to allow the manager component to recover one or more software components of the distributed software application of the apparatus of FIG. 1.

Turning to FIGS. 1-2, an illustrative description of one exemplary operation of the apparatus 100 is now presented, for explanatory purposes. Upon a failure of a software component, the manager component 104 receives (STEP 202) a notification of the failure. For example, the software component 124 comprises a failed software component. The manager component 104 in one example receives a notification of the failure of the software component 124 from the executable manager 114 that monitors the software component 124. Upon receipt of the notification, the manager component 104 begins a recovery of a failed set of software components, as described herein.

The manager component 104 in one example attempts to perform (STEP 204) a shutdown of one or more other software components within a same executable as the software component 124, for example, the software component 126. The software components 124 and 126 are co-located within the executable 106. For example, the failed set of software components comprises the failed software component 124 and the software component 126 within the same executable 106.

The manager component 104 in one example sends one or more shutdown messages to the executable manager 114 to cause a shutdown of the software component 126. In one example, the shutdown message comprises an indication to cause the shutdown of the software component 126 without waiting for a timeout of communication with other software components, as will be appreciated by those skilled in the art. The executable manager 114 sends one or more shutdown messages to the software component 126, for example, to the management support software 132 of the software component 126, to cause the shutdown of the software component 126. Upon shutdown of the software components within the executable of the failed software component, the executable manager 114 performs a shutdown of the executable 106.

Upon the shutdown of the executable 106, the manager component 104 in one example makes a determination (STEP 206) of one or more related software components. Related software components in one example comprise one or more dependency relationships with the failed software component. Exemplary conditions for a dependency relationship comprise shared state information and communication channels between software components. For example, where the software component 128 comprises shared state information with the software component 124, the software component 128 comprises a dependency relationship with the software component 124. In another example, the related software components comprise software components that run on the same processor, for example, the software components 126 and 178. In yet another example, the related software components comprise a portion of a pre-determined failure group. The pre-determined failure group comprises a plurality of executables and/or a plurality of software components. For example, upon a failure of any one software component and/or executable of the pre-determined failure group, each executable and/or software component within the pre-determined failure group must be shut down and recovered. Where the software component 124 and the software component 184 comprise a portion of a same pre-determined failure group, the failed set of software components comprises the software component 124 and the software component 184, as will be appreciated by those skilled in the art.

The manager component 104 in one example causes a shutdown (STEP 208) of the related software components, for example, the software components 126, 128, 178, and 184. In a further example, the manager component 104 causes a shutdown of the executables of the related software components, for example, the executables 176 and 172. For example, the manager component 104 sends one or more shutdown messages to the executable managers 114 and 116 to cause the shutdown of the software components 126, 128, 178, and 184.

Upon shutdown of the related software components, the manager component 104 in one example invalidates (STEP 210) one or more communication channels to the failed software components and/or the related software components. For example, the manager component 104 sends one or more messages to one or more software components that comprise a communication channel 160 with the failed software component and/or the related software components, for example, the software component 180. The manager component 104 in one example sends the message to the management support software 132 of the software component 180. The management support software of the software component 180 notifies the application software 130 of the software component 180 that the communication channel to the software component 124 has been invalidated.

The manager component 104 in one example makes a determination that the failed software component, for example, the software component 124, comprises an active component of an active/standby group. The manager component 104 sends (STEP 212) a state information message to the standby component of the active/standby group, for example, the software component 182. The message comprises state information for the standby component to assume a role of the active component. The manager component 104 in one example updates (STEP 214) one or more object references to the failed software component with object references to the standby component. For example, the manager component 104 sends a message to the management support software 132 of the software component 182. The management support software of the software component 182 updates the communication channel with the object reference of the standby component. The manager component 104 sends a message (STEP 216) to the standby component to promote the standby component to the active component. For example, the manager component 104 sends a message to the management support software 132 of the software component 182. The management support software 132 of the software component 182 communicates with the application software 130 of the software component 182 through the application programming interface 136 of the software component 182 to cause the software component 182 to be promoted to the active component, as will be appreciated by those skilled in the art.

Upon completion of the invalidation of the object references, and promotion of the standby when applicable, the manager component 104 performs a startup of two or more new software components that correspond to the failed set of software components. For example, the new software components replace one or more of the failed software components, the related software components, and/or the standby components that were promoted to active components. Startup of the new software components, for example, instances of the software components 124, in one example comprises a plurality of steps. A first step comprises creation of a new software component, for example, an instance of the software component 124. For example, where the software component 124 comprises a data structure, the first step comprises creation of the data structure in memory of the processor 110. A second step comprises establishing communication channels with the software component 124. For example, establishing a communication channel to allow the software component 126 to set and/or retrieve a value of the data structure. A third step comprises initialization of the software component, for example, setting the value of the data structure to a pre-determined value. The manager component 104 in one example starts up and/or initializes the software components in an ordered sequence, as described in SOFTWARE COMPONENT INITIALIZATION IN AN ORDERED SEQUENCE.

Upon determination of the available processors, the manager component 104 assigns (STEP 218) the executables that must be recovered, for example, the executable 106, to the available processors. For example, the manager component 104 assigns the executable 106 to the processor 110. In one example, the executables comprise one or more limitations to which processor they may be executed on. In another example, the software components within the executables comprise limitations to which processor they may be executed on. The manager component 104 in one example obtains the limitations for the executables and/or software components from the configuration file 150. The manager component 104 in one example assigns the executables to the available processors based on the limitations of the executables and/or the software components within the executables. In another example, the manager component 104 assigns the executables to the available processors based on one or more load balancing limitations. The manager component 104 starts only the executables that were previously shut down for recovery, for example, the executable 106, as will be appreciated by those skilled in the art.

The manager component 104 starts the executable 106 on the processors 110 through employment of the executable manager 114. For example, the manager component 104 sends one or more messages to the executable managers 114 to start the executable 106. The messages comprise one or more parameters for execution of the executable 106 and/or creation of the software components 124 and 126. Upon execution of the executable 106, the software components 124 and 126 are created.

The manager component 104 sends one or more messages to the executable managers 114 and 116 to cause the initialization of the software components 128, 178, 184, and 180 in the ordered sequence. Each software component 124, 126, 128, 178, 184, and 180 comprises a communication handle, for example, a unique identifier. The manager component 104 receives (STEP 220) the communication handles for the software components 124, 126, and 128 from the executable managers 114 and 116. In one example, the manager component 104 stores the communication handles for the software components 124, 126, and 128 in the configuration file 150. In another example, the manager component 104 assigns the communication handles to data structures within the manager component 104 that correspond to the software components 124, 126, and 128. For example, the manager component 104 binds to the software components 124, 126, and 128.

The manager component 104 passes (STEP 222) the communication handles to the software components 124, 126, 128, 178, 184, and 180, for example, to set up communication channels between the software components 124, 126, 128, 178, 184, and 180. Once the software components 124, 126, 128, 178, 184, and 180 have the communication handles, the manager component 104 initializes (STEP 224) the software components 124, 126, 128, 178, 184, and 180 in the ordered sequence.

Where the new software components comprise dependency relationships, initialization of the software components must take place in an ordered sequence, as described herein. Exemplary conditions for a dependency relationship comprise shared state information and communication channels between software components. In one example, before a communication channel between the software component 124 and the software component 128 can be established, both the software component 124 and the software component 128 must be created. In another example, before a shared value for the software component 126 can be retrieved from the software component 124, the software component 124 must have the shared value set, as will be appreciated by those skilled in the art.

The new software components comprise new instances of the software components 124, 126, 128, 178, 184, and 180. The manager component 104 employs the configuration file 150 to initialize the software components 124, 126, 128, 178, 184, and 180 in the ordered sequence. In one example, the manager component 104 receives the configuration file 150 in the message from the external environment 151. In another example, the manager component 104 obtains the configuration file 150, for example, from a disk drive or database, as will be appreciated by those skilled in the art. Once the manager component 104 has received and/or obtained the configuration file 150, the manager component 104 makes a determination of available processors for the executables that must be recovered, for example, the processors 110 and 112. The manager component 104 in one example obtains a list of available processors from the configuration file 150.

In one example, the software component 124 comprises a dependency relationship with the software component 128 and the software component 126. For example, the software component 124 is dependent on the software component 128 and the software component 126 is dependent on the software component 124. The manager component 104 makes a determination of the ordered sequence based on the dependency relationships. For example, the ordered sequence comprises the software component 128, followed by the software component 124, followed by the software component 126. The manager component 104 initializes the software components 124, 126, and 128 in the ordered sequence. For example, the manager component 104 performs an initialization of the software component 128. Upon completion of the initialization of the software component 128, the manager component 104 performs an initialization of the software component 124. Upon completion of the initialization of the software component 124, the manager component 104 performs an initialization of the software component 126, as will be appreciated by those skilled in the art.

In another example, the software component 124 comprises a dependency relationship with the software component 126. The software component 128 does not comprise a dependency relationship with the software components 124 or 126. The manager component 104 performs the initialization of the software components 124 and 128 concurrently, for example, in parallel. Parallel initialization of the software components 124 and 128 promotes a reduction in time needed for initialization of the distributed software application 102, as will be appreciated by those skilled in the art.

Upon initialization of the software components 124, 126, 128, 178, 184, and 180, the manager component 104 causes the executable managers 114 and/or 116 to monitor (STEP 226) the software components 124, 126, 128, 178, 184, and 180. For example, the manager component 104 sends a message to the executable manager 114. Upon receipt of the message, the executable manager 114 begins to monitor the software components 124, 126 and 178. The manager component 104 sends another message to the executable manager 116. Upon receipt of the other message, the executable manager 116 begins to monitor the software components 128, 184 and 180. Upon initiation of the monitoring of the software components 124, 126, and 128 by the executable managers 114 and 116, the manager component 104 sends (STEP 226) one or more messages to the software components 124, 126, 128, 178, 184 and 180 to start a checkpoint procedure, as described in MANAGER COMPONENT FOR CHECKPOINT PROCEDURES.

Upon a failure of the startup of one or more of the failed software components, the manager component 104 in one example performs a fault escalation procedure. Each software component may have a different fault escalation procedure defined in the configuration file 150. In one example, upon the failure of the startup, the manager component 104 attempts to perform another startup of the one or more failed software components after a pre-determined time interval. In another example, the manager component 104 performs a migration of the one or more failed software components. For example, the manager component 104 attempts to perform another startup of the one or more failed software components on another processor. In yet another example, the manager component 104 employs a user-defined fault escalation procedure. In another example, the manager component 104 performs a shutdown and recovery of each of the plurality of software components of the distributed software application 102, for example, the manager component 104 restarts the distributed software application 102. Several fault escalation procedures may be used for recovery of a software component. For example, the manager component 104 may first attempt to restart a failed software component, then attempt to migrate the failed software component, and finally restart the distributed software application 102.

The apparatus 100 in one example comprises a plurality of components such as one or more of electronic components, hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise recordable data storage medium of the manager component 104. The computer-readable signal-bearing medium for the apparatus 100 in one example comprise one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network. The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a manager component for a distributed software application, wherein the distributed software application comprises a plurality of software components within a plurality of executables, wherein the plurality of executables are distributed over a plurality of processors;
wherein the manager component performs a recovery of two or more software components, of the plurality of software components, in an ordered sequence based on one or more dependency relationships among the plurality of software components;
wherein the recovery of the two or more software components in the ordered sequence comprises a startup in the ordered sequence of two or more new software components that correspond to the two or more software components;
wherein the manager component obtains one or more object references to one or more of the two or more new software components and creates one or more communication channels between the two or more new software components and the plurality of software components.

2. The apparatus of claim 1, wherein the two or more software components comprise a first software component and a second software component;
wherein the second software component comprises a dependency relationship with the first software component, wherein the second software component is dependent on the first software component;
wherein the manager component performs a recovery of the first software component before a recovery of the second software component.

3. The apparatus of claim 1, wherein the two or more software components comprise at least one failed software component and one or more related software components;
wherein the manager component identifies the one or more related software components of the plurality of software components through employment of a configuration file;
wherein the one or more related software components comprise one or more dependency relationships, of the one or more dependency relationships among the plurality of software components, with the at least one failed software component;
wherein the manager component performs a recovery of the one or more related software components.

4. The apparatus of claim 3, wherein the one or more dependency relationships of the one or more related software components comprise one or more of:
collocation within a same executable;
collocation on a same processor; and/or
a pre-determined failure group of a plurality of software components, wherein the manager component performs a recovery of each software component of the pre-determined failure group upon a failure of any one of the plurality of software components of the failure group.

5. The apparatus of claim 3, wherein the manager component sends one or more shutdown messages to cause a shutdown of one or more of the one or more related software components without completion of a communication timeout for one or more of the one or more related software components.

6. The apparatus of claim 1, wherein the two or more software components of the plurality of software components comprise a failed set of software components;
wherein one or more of the plurality of software components comprise one or more object references to one or more of the failed set of software components;
wherein the manager component invalidates the one or more object references to the one or more of the failed set of software components.

7. The apparatus of claim 6, wherein the two or more new software components correspond to the failed set of software components;
wherein the manager component sends a message to an executable manager of a processor to cause the startup of the two or more new software components;

wherein the executable manager monitors the two or more new software components.

8. The apparatus of claim 7, wherein the manager component updates the one or more object references to the failed set of software components with one or more object references to the two or more new software components.

9. The apparatus of claim 7, wherein the failed set of software components comprises an active component of an active/standby group of software components;
   wherein the plurality of software components comprise a standby component of the active/standby group of software components;
   wherein the manager component sends one or more messages to the standby component to promote the standby component to an active component in the ordered sequence.

10. The apparatus of claim 7, wherein the failed set of software components comprises a failed standby component of an active/standby group of software components;
    wherein the manager component sends a message to the executable manager to cause a startup of another standby component of the active/standby group of software components;
    wherein the manager component passes state information to the other standby component upon startup of the other standby component.

11. The apparatus of claim 7, wherein the one or more object references comprise one or more first object references to one or more of the two or more new software components;
    wherein the manager component employs the one or more first object references to create one or more first communication channels from the plurality of software components to the two or more new software components;
    wherein the manager component obtains one or more second object references to one or more of the plurality of software components and creates one or more second communication channels from the two or more new software components to the plurality of software components.

12. The apparatus of claim 7, wherein the manager component initializes a checkpoint procedure of the two or more new software components.

13. The apparatus of claim 7, wherein upon an error of the startup of the two or more new software components, the manager component performs a procedure that comprises a retry of the startup after a pre-determined time interval.

14. The apparatus of claim 7, wherein the manager component performs the startup of the two or more new software components on a first processor;
    wherein, upon an error of the startup of the two or more new software components on the first processor, the manager component performs a procedure that comprises a migration of the two or more new software components from the first processor to a second processor;
    wherein the manager component performs a startup of the two or more new software components on the second processor.

15. The apparatus of claim 7, wherein the manager component performs the startup of the two or more new software components on a first processor;
    wherein upon an error of the startup of the two or more new software components on the first processor, the manager component performs a first procedure that comprises a retry of the startup on the first processor after a pre-determined time interval;
    wherein upon a determination of one or more failures of the first procedure, the manager component performs a second procedure that comprises a migration of the two or more new software components from the first processor to a second processor;
    wherein the manager component performs a startup of the two or more new software components on the second processor;
    wherein upon a determination of one or more failures of the second procedure, the manager component performs a third procedure that comprises a processor recovery of one or more of the plurality of software components that are collocated on the second processor;
    wherein upon a determination of one or more failures of the third procedure, the manager component performs a fourth procedure that comprises a system recovery of the plurality of software components.

16. The apparatus of claim 7, wherein upon an error of the startup of the two or more new software components, the manager component performs one or more user-defined fault escalation procedures.

17. The apparatus of claim 1, wherein the two or more software components comprise a failed software component and a related software component that is dependent on the failed software component;
    wherein the recovery of the two or more software components comprises:
    the shutdown of the related software component; and
    a startup of a first software component and a startup of a second software component in the ordered sequence, wherein the first software component and the second software component correspond to the failed software component and the related software component, respectively.

18. A method, comprising the step of:
    recovering two or more software components of a plurality of software components for a distributed software application in an ordered sequence based on one or more dependency relationships among the plurality of software components;
    wherein the two or more software components comprise a failed software component and a related software component;
    wherein the step of recovering the two or more software components comprises the steps of:
    performing a startup of a first software component and a startup of a second software component in the ordered sequence based on the one or more dependency relationships among the plurality of software components, wherein the first software component and the second software component correspond to the failed software component and the related software component, respectively;
    obtaining one or more object references to one or more of the first and second software components;
    creating one or more communication channels between the plurality of software components and the first and second software components.

19. The method of claim 18, wherein the step of recovering the two or more software components comprises the steps of:
    performing a shutdown of the failed software component;
    identifying the related software component through employment of a configuration file;

performing a shutdown of the related software component.

20. An apparatus, comprising:

a high availability manager component of a high availability infrastructure for a distributed software application that comprises a plurality of software components within a plurality of executables, wherein the plurality of executables are distributed over a plurality of processors;

a plurality of executable managers of the high availability infrastructures, wherein the plurality of executable managers correspond to the plurality of processors;

wherein the plurality of software components comprise management support software, wherein the management support software comprises a portion of the high availability infrastructure;

wherein the high availability manager component, the plurality of executable managers, and the management support software cooperate to recover two or more of the plurality of software components in an ordered sequence based on one or more dependency relationships among the plurality of software components;

wherein the two or more of the plurality of software components comprise a failed software component and a related software component that is dependent on the failed software component;

wherein the high availability manager component, the plurality of executable managers, and the management support software cooperate to perform a startup of a first software component and a second software component in the ordered sequence, wherein the first software component and the second software component correspond to the failed software component and the related software component, respectively;

wherein the high availability manager component, the plurality of executable managers, and the management support software cooperate to create one or more communication channels between the plurality of software components and the first and second software components.

21. The apparatus of claim 20, wherein the two or more of the plurality of software components comprise a failed set of software components, wherein the high availability manager component sends one or more messages to one or more of the plurality of executable managers to cause a shutdown of the failed set of software components;

wherein the one or more of the plurality of executable managers perform a startup of two or more new software components that correspond to the failed set of software components;

wherein the one or more of the plurality of executable managers monitor the two or more new software components;

wherein the high availability manager component cooperates with the management support software to set initial values for the two or more new software components.

* * * * *